United States Patent
Parrie et al.

(10) Patent No.: US 8,857,792 B2
(45) Date of Patent: Oct. 14, 2014

(54) SEAL RING ASSEMBLIES FOR USE WITH ROTARY VALVES

(75) Inventors: Timothy Randall Parrie, Mingo, IA (US); Wilbur Dean Hutchens, Marshalltown, IA (US); Steven Douglas Cherry, Howe, TX (US)

(73) Assignee: Fisher Controls International LLC, Marshalltown, IA (US)

( * ) Notice: Subject to any disclaimer, the term of this patent is extended or adjusted under 35 U.S.C. 154(b) by 53 days.

(21) Appl. No.: 13/470,846

(22) Filed: May 14, 2012

(65) Prior Publication Data
US 2013/0299729 A1 Nov. 14, 2013

(51) Int. Cl.
*F16K 1/22* (2006.01)
(52) U.S. Cl.
USPC ...... 251/306; 251/314; 251/317; 251/317.01; 277/584; 277/638; 277/640; 29/890.122
(58) Field of Classification Search
USPC ............ 251/304–307, 314, 316, 317, 317.01; 277/630, 637, 638, 640, 650, 584; 29/890.122–890.129, 446
See application file for complete search history.

(56) References Cited

U.S. PATENT DOCUMENTS

| | | | | |
|---|---|---|---|---|
| 3,144,040 | A | * | 8/1964 | White ..................... 137/315.23 |
| 3,630,485 | A | * | 12/1971 | Williams ..................... 251/307 |
| 5,160,118 | A | * | 11/1992 | Stary .............................. 251/173 |
| 5,299,812 | A |  | 4/1994 | Brestel et al. |
| 5,372,099 | A | * | 12/1994 | Matsunuma et al. ...... 123/90.48 |
| 5,542,681 | A |  | 8/1996 | Hutchens et al. |
| 2007/0138429 | A1 |  | 6/2007 | Hutchens et al. |
| 2007/0215834 | A1 | * | 9/2007 | Helfer et al. .................. 251/359 |
| 2009/0032759 | A1 | * | 2/2009 | Fehringer ..................... 251/306 |
| 2009/0114869 | A1 | * | 5/2009 | Higgs ............................ 251/305 |
| 2011/0265886 | A1 |  | 11/2011 | Dalluge et al. |
| 2011/0266482 | A1 |  | 11/2011 | Dalluge et al. |

OTHER PUBLICATIONS

"Torqseal Triple-Offset Metal-Seated Butterfly Valves," Velan Inc., http://www.velan.com/, 2006 (24 pages).

* cited by examiner

*Primary Examiner* — John K Fristoe, Jr
*Assistant Examiner* — Marina Tietjen
(74) *Attorney, Agent, or Firm* — Hanley, Flight and Zimmerman, LLC

(57) ABSTRACT

Seal ring assemblies for use with rotary valves and methods to manufacture the same are disclosed. A seal ring assembly is described that includes a ring-shaped seal to be fixed within the rotary valve, where the seal enables the sealing engagement of a control member with a flow control aperture. The seal is compressed between a first seal clamp and a second seal clamp by a compressive force maintained by a plurality of fasteners extending through the seal and fixed to the first and second seal clamps.

19 Claims, 8 Drawing Sheets

SEAL RING ASSEMBLIES FOR USE WITH ROTARY VALVES

FIELD OF THE DISCLOSURE

This patent relates generally to seal assemblies and, more particularly, to seal ring assemblies for use with rotary valves.

BACKGROUND

Process control plants or systems often employ rotary valves, such as ball valves, butterfly valves, eccentric-disk valves, eccentric-plug valves, etc., to control the flow of process fluids. Rotary valves typically include a fluid flow control member (e.g., a disc, a ball, etc.) within a flow control aperture of the valve and rotatably coupled to the body of the valve via a shaft. To control the flow of fluid through some rotary valves, the position of the fluid flow control member may be varied from a closed position at which the fluid flow control member is in sealing engagement with a seal that surrounds the flow control aperture to a fully open or maximum flow rate position at which the fluid flow control member is spaced away from the seal.

The structure of a valve may be varied to suit the needs of a particular process control environment. For example, a butterfly valve may be a double offset valve (also known as a high-performance butterfly valve) or a triple offset valve. Triple offset valves are similar in design to double offset valves except that the control member has an eccentrically shaped circumferential surface to sealingly engage the valve seal. The angled geometry of the control member of a triple offset valve reduces contact area between the control member and the seal during closure, thus reducing wear in any application (e.g., throttling or on-off). However, triple offset valves are more expensive and can be disadvantageous due to the high torque required to engage the control member and the seal to achieve a tight shutoff.

The material selected for a seal may vary depending on the requirements of the process control environment in which the seal is to be used. For example, seals may be made of metal, polytetraflouroethylene (PTFE), or laminated graphite. A metal seal is well suited for use with high temperature and high pressure process applications but is generally more susceptible to wear. A PTFE seal provides excellent sealing performance compared to metal seals and requires less torque to unseat a disc from the seal. PTFE seals also provide a relatively long seal life but are limited to process applications that maintain temperatures below 450 degrees Fahrenheit. A graphite laminated seal can withstand much higher temperatures than a PTFE seal and provides excellent shutoff and the ability to maintain tight shutoff after a large number of cycles.

SUMMARY

Seal ring assemblies for use with rotary valves and methods to manufacture the same are disclosed. In one example, a seal ring assembly includes a ring-shaped seal to be fixed within the rotary valve, where the seal enables the sealing engagement of a control member with a flow control aperture. The seal is compressed between a first seal clamp and a second seal clamp by a compressive force maintained by a plurality of fasteners extending through the seal and fixed to the first and second seal clamps.

In another example, a seal ring assembly includes a ring-shaped seal configured to be fixed within the rotary valve, where the seal enables the sealing engagement of a control member with a flow control aperture. The seal ring assembly also includes a seal mount adjacent a first side of the seal to secure the seal within the rotary valve, an annular clamp adjacent a second side of the seal opposite the first side, and a plurality of fasteners extending through the seal and fixed to the clamp and the seal mount to maintain a compressive force on the seal between the clamp and the seal mount.

DETAILED DESCRIPTION

Securing a graphite laminated seal within a valve can be accomplished through frictional and adhesive forces created by compressing the seal between two surfaces. For example, the seal may be compressed within a seal carrier that is fixed to a valve body via a retainer ring. Alternatively, the seal may be compressed directly against a surface of the valve body via the retainer ring. Another configuration involves fixing the seal to a valve disc rather than a valve body.

Regardless of the seal fixture configuration, when a valve is opened under high pressure and high flow conditions there is a risk of the seal being loosened or pulled out by the fluid forces overcoming the frictional and adhesive forces retaining the seal. Such blowout problems can result in the loss of shut off capability.

Accordingly, the examples described herein provide a seal ring assembly having a ring-shaped seal that may be made of expanded graphite compressed between a first seal clamp and a second seal clamp. A plurality of fasteners may extend through the seal and may be affixed to the first and second seal clamps to maintain a compressive force on the seal. In some examples, the fasteners may be metal pins that are welded to the first and second seal clamps or, alternatively, may be threaded fasteners.

Additionally, the cross-sectional profiles of the example seal ring assemblies described herein may have different shapes or geometries to fit within a recess in a valve. For example, in one example, the seal ring assembly may have a substantially T-shaped cross-section to fit within a T-slot of a valve. Such a T-slot is employed in certain high performance butterfly valves. Another example seal ring assembly has a rectangular shaped cross-section to fit into a rectangular slot of a valve. Such a rectangular slot is used in some high performance butterfly valves.

Yet another example seal ring assembly described herein has a ring-shaped seal compressed between a seal clamp and a surface of a valve body, where the compressive force is maintained via threaded fasteners extending through the seal and into the valve body.

A further example seal ring assembly described herein is fixed to a seal carrier that is fixed to an anchor ring connected to the valve body. This example may function as the valve seat in a ball valve or a segmented ball valve. In this example, a fixed seat design may be employed or, alternatively, a flexible seat design having a flexible curved arm on the seal carrier may be employed.

Figure 1:
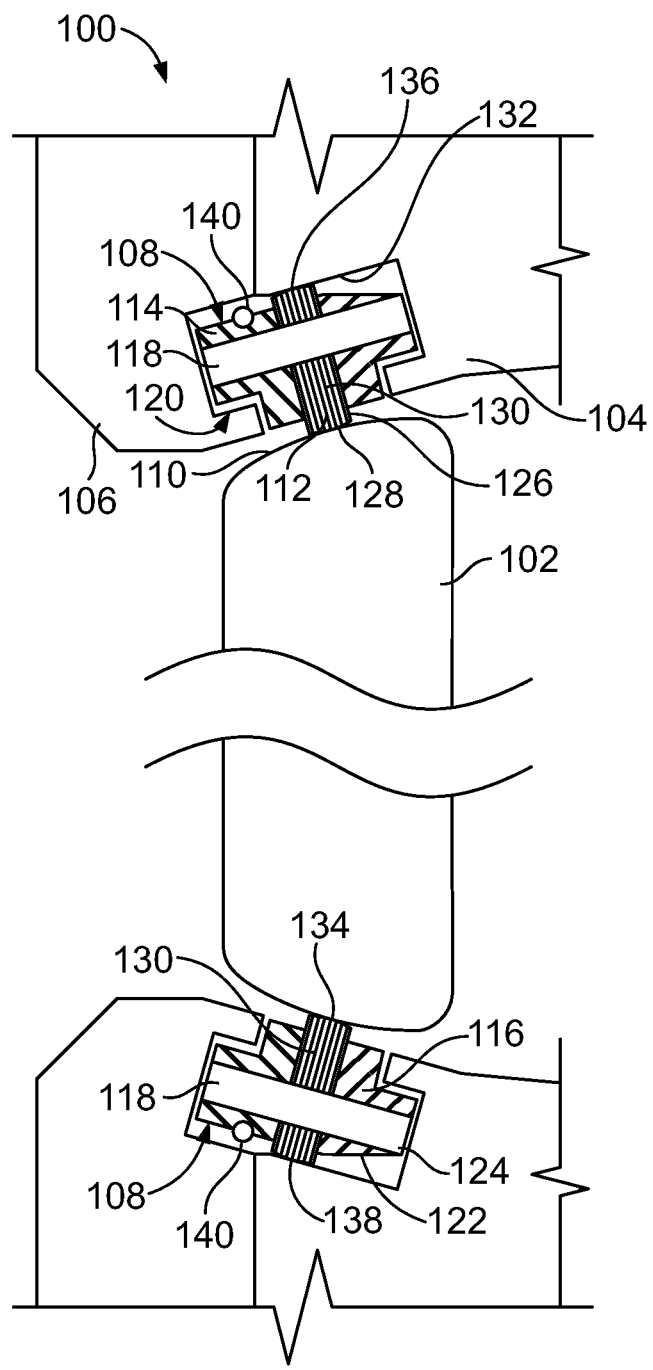
FIG. 1 is a cross-sectional view of an example seal ring assembly.

FIG. 1 is a cross-sectional view of an example seal ring assembly 108 in a butterfly valve 100. The butterfly valve 100 shown in FIG. 1 may, for example, be used to control process fluids, such as natural gas, oil, water, etc. over a wide range of temperatures. As shown in FIG. 1, the butterfly valve 100 includes a disc 102 (e.g., a movable flow control member) at which a relatively high pressure fluid may be presented. The butterfly valve 100 also includes a valve body 104 and a retainer ring 106 coupled to the valve body 104. The retainer ring 106 retains the seal ring assembly 108.

The disc 102 is mounted within the valve 100 via a valve shaft (not shown but located to the right of the disc 102). To control the flow of process fluid through the valve 100, a control valve instrument (not shown) is operatively coupled to the valve 100 and generally provides a pneumatic signal to the valve actuator (not shown) in response to a control signal from a process controller, which may be part of a distributed control system (neither of which are shown). The valve actuator is coupled to the valve shaft and, as the pneumatic signal motivates the valve actuator, the valve shaft and the disc 102 attached thereto rotate so that a contoured edge 110 of the disc 102 is positioned relative to a seal 112 of the seal ring assembly 108 to either sealingly engage the seal 112 when in a closed position or allow fluid flow when in an open position at an angle proportional to the control signal.

The seal 112 is compressed between a first seal clamp 114 and a second seal clamp 116. The first and second seal clamps 114 and 116 are made of metal, and the seal 112 is at least partially composed of laminated graphite. More particularly, the seal 112 is made of expanded graphite (e.g., Grafoil®), which recovers approximately 12% after being repeatedly compressed to approximately 40-45% of its original thickness. Depending on the process control system application, a variety of thinner materials can be laminated between layers of the graphite material. For example, the seal 112 may also include materials ranging from metal to polytetrafluoroethylene (PTFE) and/or a variety of polyolefin materials. Polybenzimidazole (PBI) fabrics used in fire retardant materials may also be laminated with the graphite.

The compressive force on the seal 112 provided by the first seal clamp 114 and the second seal clamp 116 is maintained by fasteners 118 extending through the seal 112 and securely fixed to the first seal clamp 114 and the second seal clamp 116. The fasteners 118 may be metal pins fixed to the seal clamps 114 and 116 via welding (e.g., fillet welding, laser welding, friction stir spot welding, etc.). The welding may fully penetrate the first and second seal clamps 114 and 116 to ensure a solid connection between the fasteners 118 and the first and second seal clamps 114 and 116. Alternatively, the fasteners 118 may be threaded fasteners (e.g., socket head screws, flat head screws, etc.) fixed to seal clamps 114 and 116.

As shown in FIG. 1, the first and second seal clamps 114 and 116 are formed such that the profile of the cross-section of the seal ring assembly 108 is substantially T-shaped. The T-shaped cross-section enables the seal ring assembly 108 to be securely held within a T-slot 120 of the butterfly valve 100 formed between the retainer ring 106 and the valve body 104. A relief or beveled surface 122 is formed along an edge 124 of the second seal clamp 116 to provide space or additional clearance to facilitate insertion of the T-shaped seal ring assembly 108 into the T-slot 120 of the valve body 104 and the retainer ring 106.

Although the cross-section of the seal ring assembly 108 is substantially T-shaped, FIG. 1 shows that the seal 112 protrudes above and below the seal clamps 114 and 116. The protrusion 126 of the seal 112 on an inner diameter 128 of the seal ring assembly 108 enables the disc 102 to engage the seal 112 to form a fluid seal along the disc-seal interface. Furthermore, the seal clamps 114 and 116 are shaped to hold the seal 112 such that laminated layers 130 of the seal 112 are perpendicular to a backside 132 of the T-slot 120 as well as a point of contact 134 of the contoured edge 110 of the disc 102.

As is generally known in the art, laminated seals, such as the seal 112, are manufactured with laminated layers lying in flat planes all parallel to one another. However, as shown in FIG. 1, the laminated layers 130 of the seal 112 do not lie within flat parallel planes, but define the surface of a conic section where the inner diameter 128 is skewed to one side. It should be appreciated that due to the flexible nature of the seal 112, which is made of laminated graphite, forcing the seal 112 into a cone-like shape, as shown in FIG. 1, does not damage the seal 112. The skewed orientation of the seal 112 is accomplished as a result of the shape of the seal clamps 114 and 116 of the seal ring assembly 108 when the seal 112 is first compressed between the seal clamps 114 and 116. Achieving a desired orientation of the seal 112 is explained in greater detail below in connection with FIGS. 9A and 9B.

The orientation of the seal 112 relative to the T-slot 120 and the disc 102 affects the forces required to achieve a tight seal. The force on the portion 126 on the inner diameter 128 of the seal 112 produced by engagement with the disc 102 in a closed position urges the seal ring assembly 108 such that a portion 136 of the seal 112 on an outer diameter 138 of the seal ring assembly 108 at an outer diameter 138 of the seal ring assembly 108 is forced against the backside 132 of the T-slot 120, thereby substantially preventing the flow of process fluid around the seal ring assembly 108 (e.g., leakage past the disc 102). However, obtaining a tight seal requires the seal ring 112 to engage the backside 132 of the T-slot 120 along the entire circumference of the butterfly valve 100. As a result, the disc 102 may be required to apply sufficient force to the inner diameter 128 of the seal ring assembly 108 to expand the seal ring assembly 108 in a radial direction. Due to the rigidity of the first and second seal clamps 114 and 116, this may require considerable torque input into a valve shaft (not shown) that rotates the disc 102. To reduce the torque needed to expand the seal ring assembly 108, the first and second seal clamps 114 and 116 may be segmented. This segmentation enables the seal 112 to expand more easily, thereby reducing the torque required to achieve a tight shutoff of the example butterfly valve 100. However, completely segmenting the seal clamps 114 and 116 may result in inadequate tension within the seal 112 to enable the seal 112 to rebound or contract when sealing engagement is no longer required within the valve 100. Accordingly, one or more spring wires (one of which is shown at reference numeral 140) may be stretched around one or both of the seal clamps 114 and/or 116 to provide the desired spring tension. Segmenting the seal clamps 114 and 116 and providing additional spring loads in the seal ring assembly 108 are discussed in more detail below in connection with FIG. 2.

Figure 2:
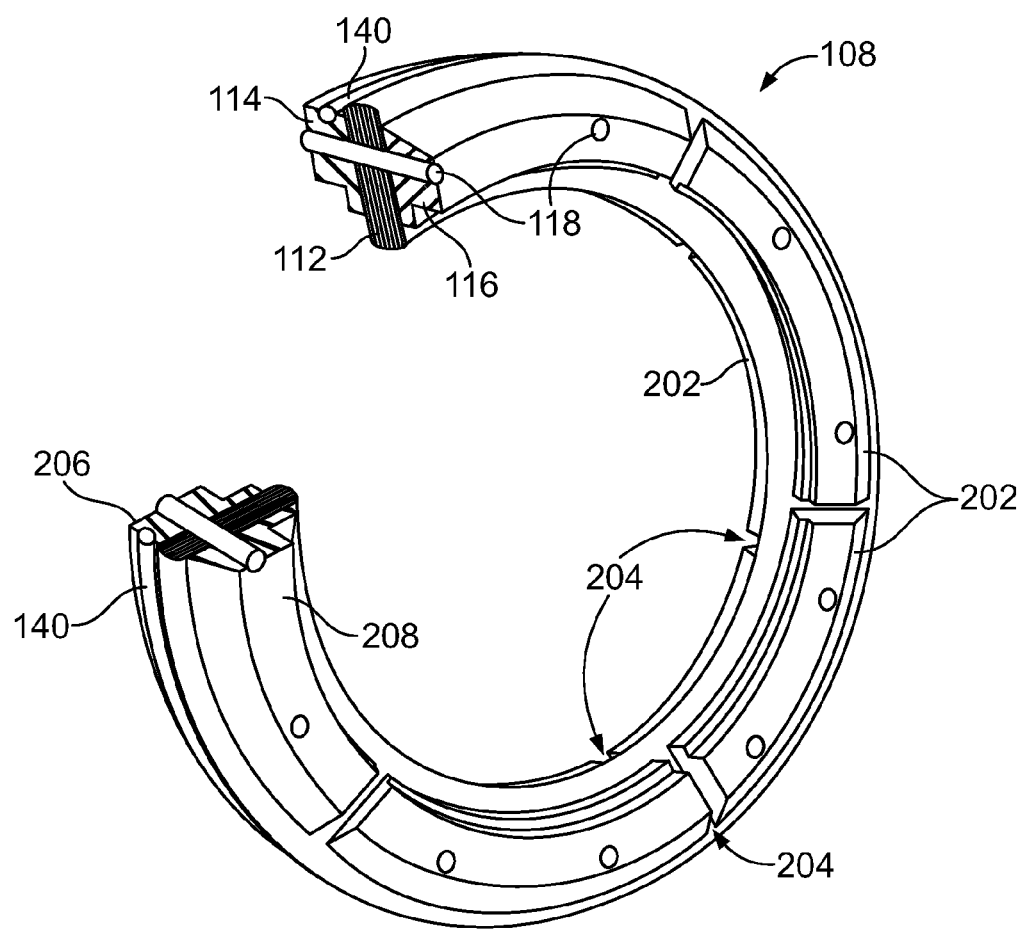
FIG. 2 is a partially cut away view of the example seal ring assembly of FIG. 1.

FIG. 2 is a partially cut away view of the example seal ring assembly 108 of FIG. 1. To achieve a tight shutoff, as discussed above in connection with the example butterfly valve 100 of FIG. 1, the force applied to the seal ring assembly 108 from the disc 102 creates sealing contact between the disc 102 and the seal 112 as well as between the seal 112 and the backside 132 of the T-slot 120. To form a tight seal on the backside 132 of the T-slot 120, the seal ring assembly 108 expands radially. In some examples, to assist in achieving sufficient sealing forces, the seal clamps 114 and 116 may have multiple segments 202 separated by relief notches 204 located between the fasteners 118 that pass from an outer surfaces 206 and 208 of the corresponding seal clamps 114 and 116 towards the seal 112. As shown in FIG. 2, the example relief notches 204 pass through the seal clamps 114 and 116 from the outer surfaces 206 and 208 to the seal 112 to completely separate the segments 202. In this way, a tight shutoff can be maintained with lower torques than would otherwise be required in conventional high-performance butterfly valves and/or triple offset valves.

As shown in FIG. 2, the notches 204 in the first seal clamp 114 are not aligned circumferentially with the notches 204 in the second seal clamp 116. Staggering or offsetting the notches 204 helps to avoid creating a failure point on the seal ring assembly 108 by ensuring that the seal 112 is supported by at least one of the seal clamps 114 or 116 at every point along the circumference of the seal ring assembly 108.

Figure 2A:
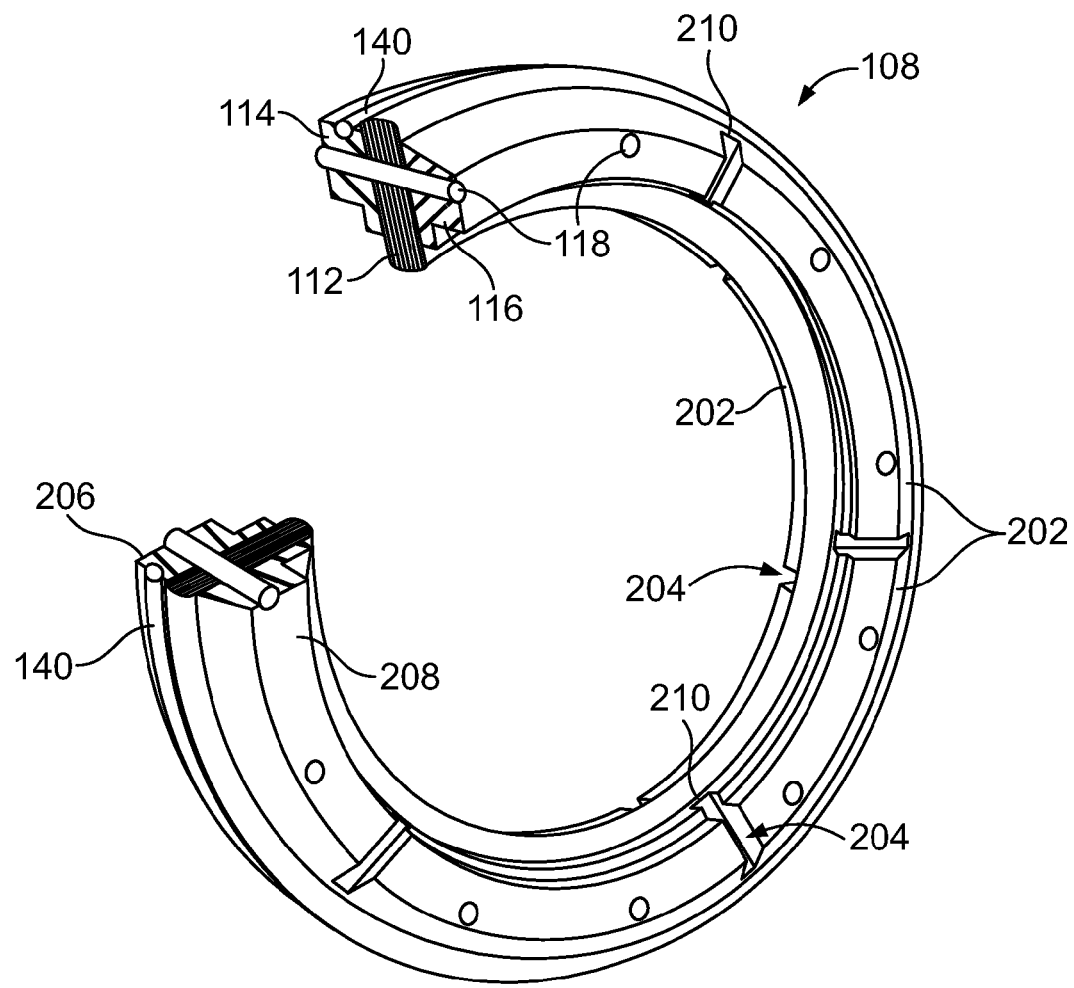
FIG. 2A is a partially cut away view of another example seal ring assembly.
Figure 2B:
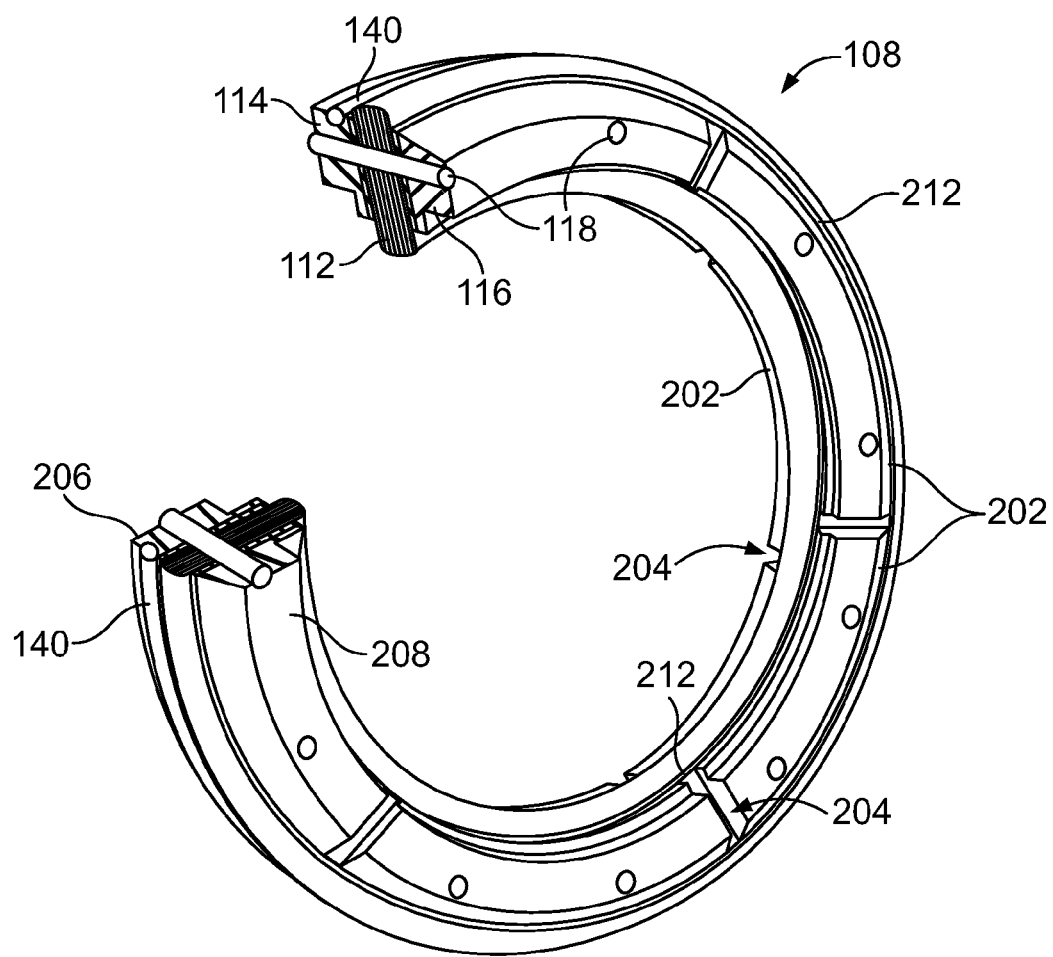
FIG. 2B is a partially cut away view of another example seal ring assembly.

Additionally, it may be desirable to provide an additional spring force within the seal ring assembly 108 to act on the seal 112 to enable it to rebound or contract radially as mentioned above. Accordingly, in some examples, the relief notches 204 may only pass a substantial way through the seal clamps 114 and 116 such that the segments 202 are connected via a relatively thin portion 210 of the seal clamps 114 and 116 (FIG. 2A) adjacent the seal 112 to enable the desired flexibility in the seal ring assembly 108 while still imposing a spring load on the seal ring assembly 108. In other examples, a thin metal shim 212 (FIG. 2B) may be placed adjacent each side of the seal 112 (during assembly as described below in connection with FIGS. 9A-10) between the seal clamps to provide the desired support and spring tension even when the relief notches 204 pass completely through the seal clamps 112 and 116. In yet other examples, the seal 112 may include metal laminate layers in addition to the graphite layers to provide the desired support. Additionally or alternatively to the above, the spring force acting on the seal ring assembly 108 may be provided the spring wire 140 stretched around an outer diameter of the first seal clamp 114 as mentioned in FIG. 1. The spring wire 140 may be secured in place by a corresponding groove extending around the outer diameter of the seal clamp 114 within which the spring wire 140 sits.

Figure 3:
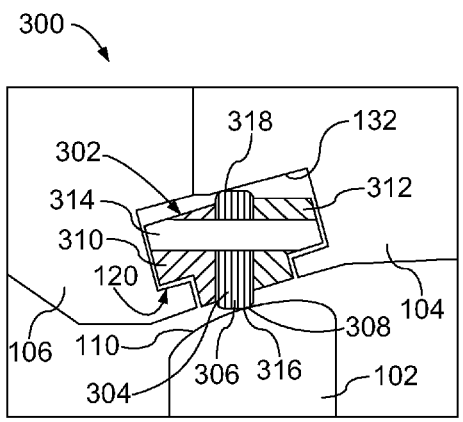
FIG. 3 is a cross-sectional view of an alternative example seal ring assembly.

FIG. 3 is a cross-sectional view of an alternative example seal ring assembly 302 in a butterfly valve 300. The butterfly valve 300 has common components to the butterfly valve 100 of FIG. 1 including the valve body 104, and the disc 102 mounted within the valve 300 via a shaft (not shown but located to the right of the disc 102). Furthermore, the butterfly valve 300 of FIG. 3 includes the retainer ring 106 coupled to the valve body 104 to form the T-slot 120 described in FIG. 1. However, FIG. 3 shows the alternative seal ring assembly 302 retained within the T-slot 120 such that laminated layers 304 of a graphite laminate seal 306 are oriented at an oblique angle relative to the backside 132 of the T-slot 120 and a point of contact 308 of the contoured edge 110 of the disc 102.

The seal 306 is compressed between a first seal clamp 310 and a second seal clamp 312. The compressive force on the seal 306 is maintained by a plurality of fasteners (one of which is shown at reference numeral 314) extending through the seal 306 and fixed to the seal clamps 310 and 312 (e.g., via welding or threading). As shown in FIG. 3, the seal ring assembly 302 is shaped such that the laminated layers 304 of the seal 306 are not skewed when the seal ring assembly 302 is compressed between the seal clamps 310 and 312. In other words, unlike the seal 112 described above in connection with FIG. 1, the laminated layers 304 of the seal 306 are positioned in flat planes parallel to one another and parallel to the plane defined by the disc 102, thereby resulting in the oblique angle with respect to the backside 132 of the T-slot 120 and the point of contact 308 of the disc 102. While the example seal ring assemblies 108 and 302 demonstrate two alternative designs for the orientation of the seals 112 and 306, respectively, the seal 306 may be oriented at any angle appropriate to the particular use for which the butterfly valve 300 is to be employed by altering the cross-sectional shape of the seal clamps 310 and 312, thereby altering the degree to which the seal 306 is skewed.

The seal 306 protrudes at an inner diameter 316 of the seal ring assembly 302 to sealingly engage the disc 102 of the example butterfly valve 300. Similarly, the seal 306 protrudes at the outer diameter 318 of the seal ring assembly 302 to seal against the backside 132 of the T-slot 120 when the disc 102 is in a closed position and pushing on the seal 306. As discussed above in connection with FIGS. 1 and 2, to reduce the torque required to achieve tight shutoff, the seal clamps 310 and 312 may be segmented to allow the seal 306 to expand radially and engage the backside 132 of the T-slot 120.

Figure 4A:
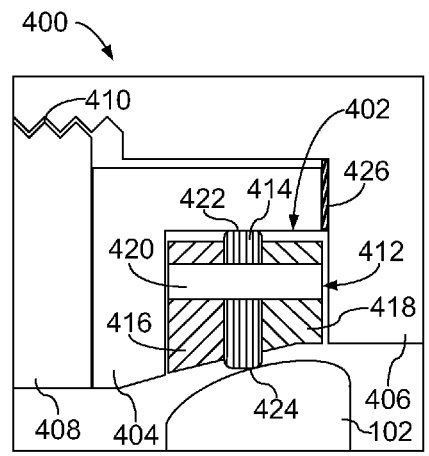
FIG. 4A is a cross-sectional view of another example seal ring assembly.
Figure 4B:
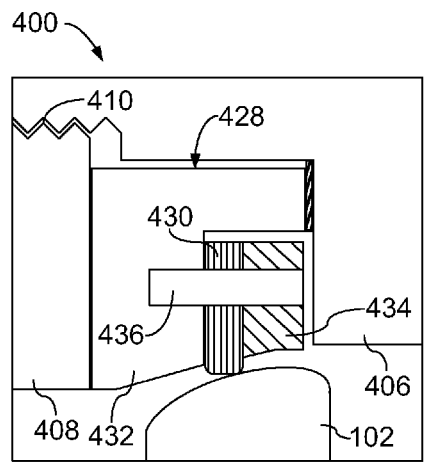
FIG. 4B is a cross-sectional view of another example seal ring assembly in the valve of FIG. 4A.

FIGS. 4A and 4B are cross-sectional views of respective example seal ring assemblies 412 and 428 in a butterfly valve 400. In FIG. 4A the seal ring assembly 412 is located within a rectangular slot 402 formed between a seal carrier 404 and a valve body 406. The seal carrier 404 is secured within the valve body 406 with a retainer ring 408 that is rigidly attached to the valve body 406 (e.g., by threads 410). Although shown as separate components, in some examples, the seal carrier 404 and the retainer ring 408 may be combined into a single component or seal mount to simplify the assembly of the valve 400.

In the butterfly valve 400, the seal ring assembly 412 includes a graphite laminate seal 414 compressed between a first seal clamp 416 and a second seal clamp 418. The compressive force on the seal ring 414 is maintained by fasteners (one of which is shown at reference numeral 420) extending through the seal 414 and rigidly fixed to the seal clamps 416 and 418. The cross-sectional profile of the seal ring assembly 412 is substantially rectangular so as to fit inside the rectangular slot 402 of the seal carrier 404 and the valve body 406. However, the seal ring assembly 412 is designed with the seal 414 protruding beyond the seal clamps 416 and 418 at an outer diameter 422 and at an inner diameter 424 of the seal ring assembly 412. The protrusion on the inner diameter 424 provides for an interference fit with the disc 102 to achieve a fluid seal between the seal 414 and the disc 102 when the disc 102 is closed. The disc 102 is opened and closed via a valve shaft, which is not shown but located to the right of the disc 102. The protrusion on the outer diameter 422 of the seal ring assembly 412 is pressed into the rectangular slot 402 of the seal carrier 404 to create a static seal between the seal 414 and the seal carrier 404.

FIG. 4A also shows a gasket 426 between the seal carrier 404 and the valve body 406 to reduce (e.g., minimize) leaks around the structural components of the example butterfly valve 400. Gaskets may or may not be included in any of the example valves described herein depending upon how the seal is incorporated in the valve assembly.

FIG. 4B illustrates an alternative example seal ring assembly 428 in the butterfly valve 400. In this example, a graphite laminate seal 430 is compressed directly against a seal carrier 432 by a seal clamp 434. The compressive force on the seal 430 is maintained by fasteners (one of which is shown at reference numeral 436) extending through the seal 430 and fixed to the seal clamp 434 and the seal carrier 432. With the seal 430 and the seal clamp 434 secured to the seal carrier 432, the seal ring assembly 428 may be inserted into the valve body 406 of the valve 400 and held in place with the retainer ring 408 fixed to the valve body 406 (e.g., by threads 410). Although shown as separate components, in some examples, the seal carrier 432 and the retainer ring 408 may be combined into a single component or seal mount to simplify the assembly of the valve 400. As a result of this design, the seal clamps 432 and 434 may not be segmented because the static seal obviates the need for the seal 430 to expand and engage the seal carrier 428 as described for the seals 112 and 306

Due to the surface contact between the seal 430 and the seal carrier 432, the outer diameter of the seal 430 may not protrude beyond the seal clamp 434 to achieve a fluid tight seal. However, the inner diameter of the seal 430 is dimensioned to enable sealing engagement between the seal 403 and the disc 102.

Figure 5:
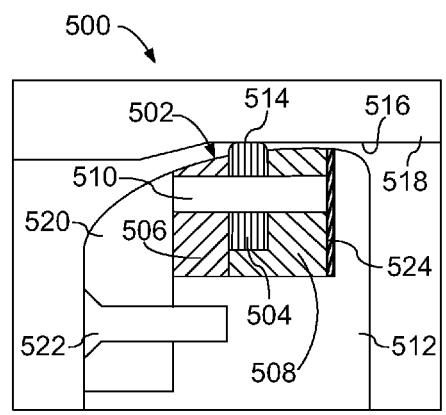
FIG. 5 is a cross-sectional view of another example seal ring assembly.

FIG. 5 is a cross-sectional view of another example seal ring assembly 502 in a butterfly valve 500. The seal ring assembly 502 includes a graphite laminate seal 504 compressed between a first seal clamp 506 and a second seal clamp 508. The compressive force on the seal ring 504 is maintained by fasteners (one of which is shown at reference numeral 510) extending through the seal 504 and rigidly fixed to the seal clamps 506 and 508. In contrast to the examples described above, the seal ring assembly 502 of FIG. 5 is attached to the perimeter of a valve disc 512 such that when the disc 512 is in a closed position, a protruding end 514 of the seal 504 sealingly engages a wall 516 of a valve body 518. Although not shown, a valve shaft is located to the right of the disc 512 to enable the disc 512 to open and close.

The seal ring assembly 502 is secured to the disc 512 via a retainer ring 520 that presses the seal ring assembly 502 against the disc 512 when a screw 522 is tightened to hold the seal ring assembly 502 in place. In some examples, the first seal clamp 506 and the retainer ring 520 may be integrated into a single component or seal mount. In such examples, the seal 504 may be compressed directly against the seal mount with the second seal clamp 508 on the other side and secured in place with the fasteners 510 extending into the seal mount similar to the seal ring assembly 428 of FIG. 4B. FIG. 5 also shows a gasket 524 between the seal ring assembly 502 and the valve disc 512 to reduce (e.g., prevent) leaks around the structural components of the example seal ring assembly 502.

Figure 6:
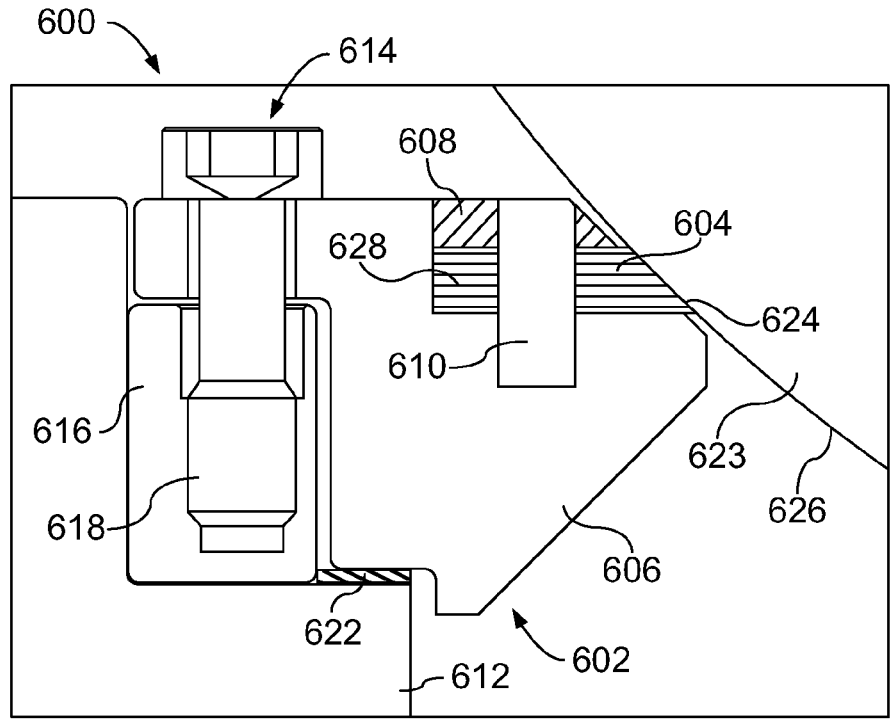
FIG. 6 is a cross-sectional view of another example seal ring assembly.

FIG. 6 is a cross-sectional view of another seal ring assembly 602 in a ball valve or segmented ball valve 600. The seal ring assembly 602 includes a graphite laminate seal 604 compressed between a first seal clamp 606 and a second seal clamp 608. The compressive force is maintained by fasteners (one of which is shown at reference numeral 610) extending through the seal 604 and fixed to the first and second seal clamps 606 and 608.

The first seal clamp 606 is designed with a profile to not only hold the seal 604, but to be securely fastened to the valve body 612 via an anchoring system 614. The anchoring system 614 includes an anchor ring 616 that is securely fixed to the valve body 612 containing a plurality of tapped holes 618 to receive a plurality of screws 620 that extend through the first seal clamp 606 to secure the seal ring assembly 602 in place. In addition, the first seal clamp 606 is designed to fit over the anchor ring such that when the seal clamp 606 is secured in place via the screws 620, the first seal clamp 606 mates with a gasket 622 placed between the valve body 612 and the first seal clamp 606, thereby preventing the flow of process fluid around the seal ring assembly 602 (e.g., leakage past a valve ball 623).

With the gasket 622 preventing fluid from passing around the seal ring assembly 602, the seal 604 of the seal ring assembly 608 only protrudes at an inner diameter 624 of the seal ring assembly 602 to create a fluid seal as the seal 604 contacts a surface 626 of the valve ball 623. Although not shown, the center line of a valve shaft to rotate the ball 623 lies horizontally above FIG. 6. Due to the location on the valve ball 623 where the seal 604 engages the surface 626 of the valve ball 623, as well as the orientation of the seal 604 with respect to the surface 626 as shown in FIG. 6, the end of the seal 604 at the inner diameter 624 of the seal ring assembly 602 may be angled relative to the direction of laminated layers 628 to better mate with the surface 626 of the valve ball 623. To achieve the desired angle at the end of the seal 604, the seal 604 may be machined after being compressed into the seal ring assembly 602 and the seal clamps 606 and 608 have been machined to their final shapes (this process is discussed more fully below in connection with FIGS. 9A, 9B, and 10).

Figure 7:
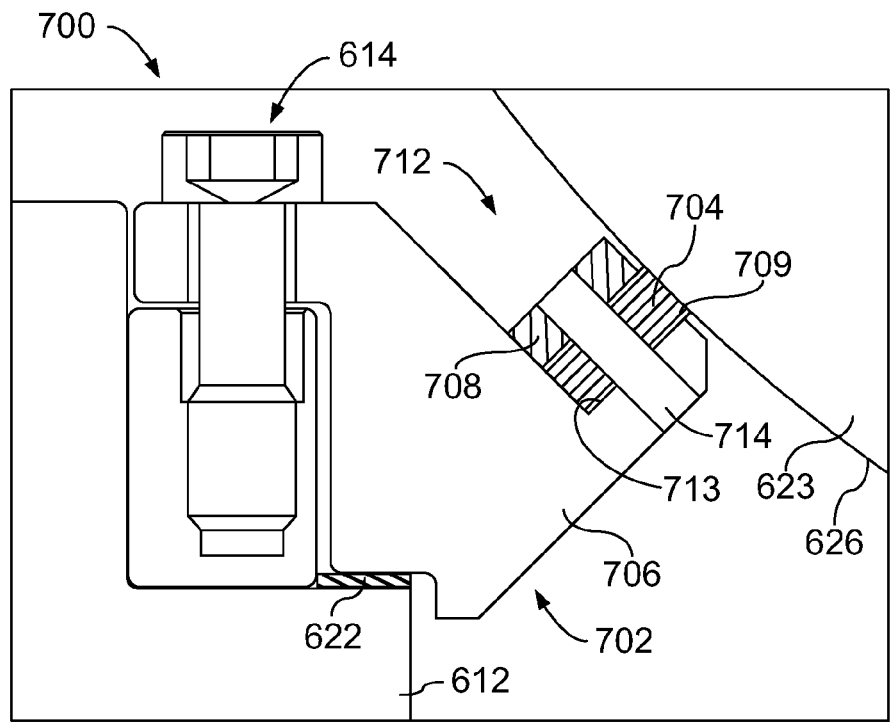
FIG. 7 is a cross-sectional view of an alternative seal ring assembly that may be used to implement the example seal ring assembly of FIG. 6.

FIG. 7 is a cross-sectional view of an alternative seal ring assembly 702 in a ball valve or segmented ball valve 700. In this example, a graphite laminate seal 704 is compressed between a first seal clamp 706 and a second seal clamp 708 such that the laminated layers 709 of the seal 704 are oriented perpendicular to the surface 626 of the valve ball 623. Although not shown, the center line of a valve shaft to rotate the ball 623 lies horizontally above FIG. 7. As discussed above in connection with FIGS. 1-3, the alternate orientation of the seal 704 in the valve 700 is accomplished by shaping the seal clamps 706 and 708 to secure the seal 704 in the desired orientation when compressed between the seal clamps 706 and 708. More particularly, the alternate orientation of the seal 704 is accomplished by forming an opening 712 in the first seal clamp 706 with a flanged surface 713. The seal 704 may be compressed directly against the surface 713 with the second seal clamp 708 on the other side of the seal 704 to force the seal 704 into the shape of a conic section. The compressive force may then be maintained via fasteners (one of which is shown at reference numeral 714) extending through the seal 704 and fixed to the first and second seal clamps 706 and 708. In addition to a perpendicular orientation of laminated layers 709 of the seal 704 relative to the surface 626 of the valve ball 623, any number of different angles may be achieved by varying the cross-sectional profiles of the first and second seal clamps 706 and 708.

The seal clamp 704 is also designed to be fixed to the valve body 612 via the anchoring system 614 described above in connection with FIG. 6. Additionally, the seal carrier engages the gasket 622 against the valve body 612 to prevent fluid from passing around the seal ring assembly 702.

Figure 8:
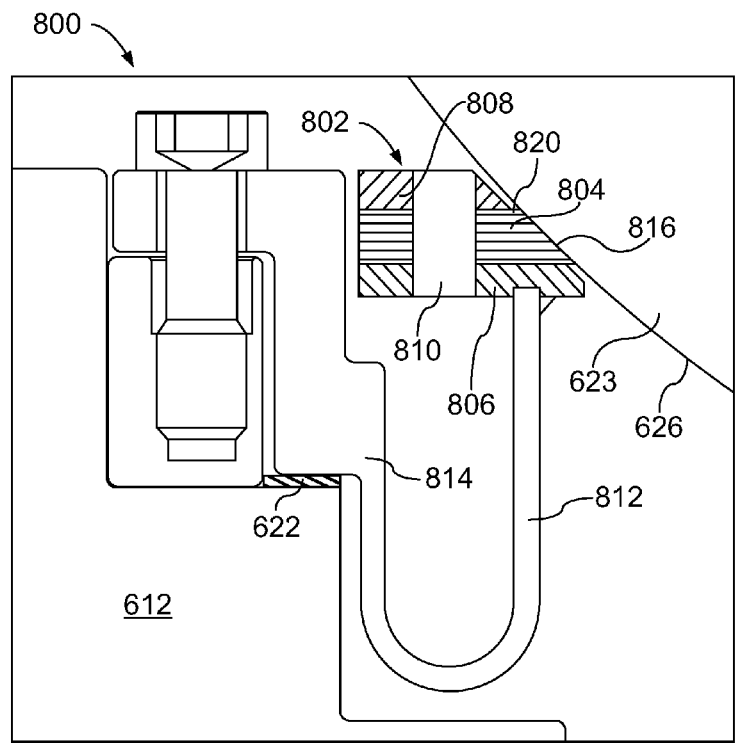
FIG. 8 is a cross-sectional view of another example seal ring assembly.

FIG. 8 illustrates another example seal ring assembly 802 in a ball valve or segmented ball valve 800. The seal ring assembly 802 includes a graphite laminate seal 804 compressed between a first seal clamp 806 and a second seal clamp 808. The compressive force is maintained by fasteners (one of which is shown at reference numeral 810) extending through the seal 804 and fixed to the first and second seal clamps 806 and 808. Furthermore, the first seal clamp 806 is fixed to the end of a flexible curved arm 812 (e.g., by welding) of a seal carrier 814 to provide flexibility in the seal ring assembly 802 to engage the surface 626 of the valve ball 623. To achieve a tight seal, the seal ring assembly 802 is designed such that the seal 804 extends beyond the first and second seal clamps 806 and 808 at an inner diameter 816 with a small protrusion 820 that creates an interference fit with the valve ball 623. Although not shown, the center line of a valve shaft to rotate the ball 623 runs horizontally above FIG. 8.

The seal carrier 814 is also designed to be fixed to the valve body 612 via the anchoring system 614 described above in connection with FIG. 6. Additionally, the seal carrier engages the gasket 622 against the valve body 612 to prevent fluid from passing around the seal ring assembly 802.

Figure 9A:
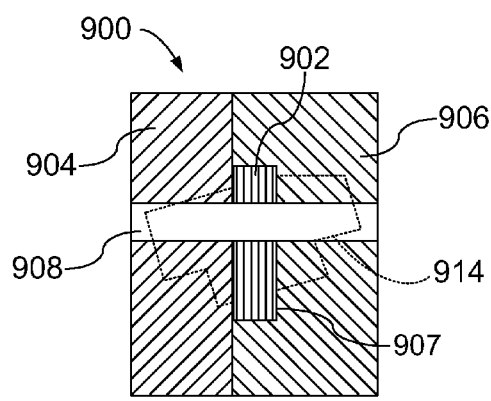
FIG. 9A is a cross-sectional view of an example seal ring assembly blank for the example seal ring assembly of FIG. 3 prior to machining to its final shape.
Figure 9B:
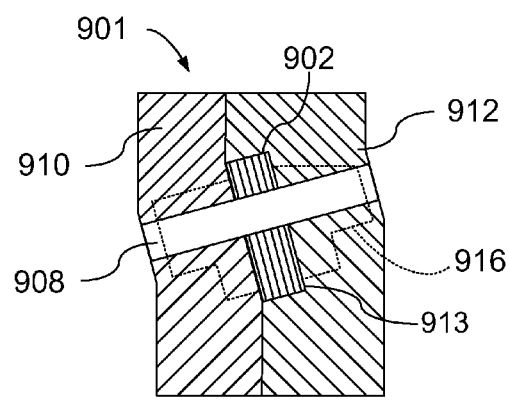
FIG. 9B is a cross-sectional view of an example seal ring assembly blank for the example seal ring assembly of FIGS. 1 and 2 prior to machining to their final shape.

FIGS. 9A and 9B illustrate cross-sectional views of example seal ring assembly blanks 900 and 901. The seal ring assembly blank 900 includes a seal 902 compressed between a first machine blank 904 and a second machine blank 906, where the second machine blank 906 has a cavity 907 to hold the seal 902. The compressive force is created by using a seal 902 with a thickness greater than the depth of the cavity 907. Thus, the seal 902 is fully compressed when the first and second machine blanks 904 and 906 contact one another around the seal. The compressive force is maintained by fasteners (one of which is shown at reference numeral 908) extending through the seal 902 and fixed to the machine blanks 904 and 906 (e.g., via welding). Similarly, the seal ring assembly blank 901 includes the seal 902 compressed between a first machine blank 910 and a second machine blank 912, where the second machine blank 912 has a cavity 913 to hold the seal 902 as with the assembly blank 900. Similarly, the compressive force is maintained by fasteners (e.g., the fastener 908) extending through the seal 902 and fixed to the machine blanks 910 and 912. Also shown in FIGS. 9A and 9B, are dotted outlines 914 and 916 of respective example cross-sectional profiles of seal ring assemblies that may be machined from the seal ring assembly blanks 900 and 901. In particular, the dotted outline 914 corresponds to the finished example seal ring assembly 302 shown in FIG. 3 and the dotted outline 916 corresponds to the finished example seal ring assembly 108 shown in FIGS. 1 and 2. As illustrated in FIG. 9B, the skewed orientation of the seal 902 corresponding to the seal 112 of the seal ring assembly 108 is accomplished due to the shape of the machine blanks 910 and 912 forcing the seal 902 into its intended orientation. Accordingly, any of the example seal ring assemblies described herein or other seal ring assemblies can be machined from seal ring assembly blanks similar to the seal ring assembly blanks 900 and/or 901 by changing the shape and/or size of the machine blanks. For example, varying the size and shape of the machine blanks enables the cross-sectional profiles and seal orientation of any of the example seal ring assemblies illustrated in FIGS. 4A, 4B, and 5-8 to be similarly machined from corresponding seal ring assembly blanks.

Figure 10:
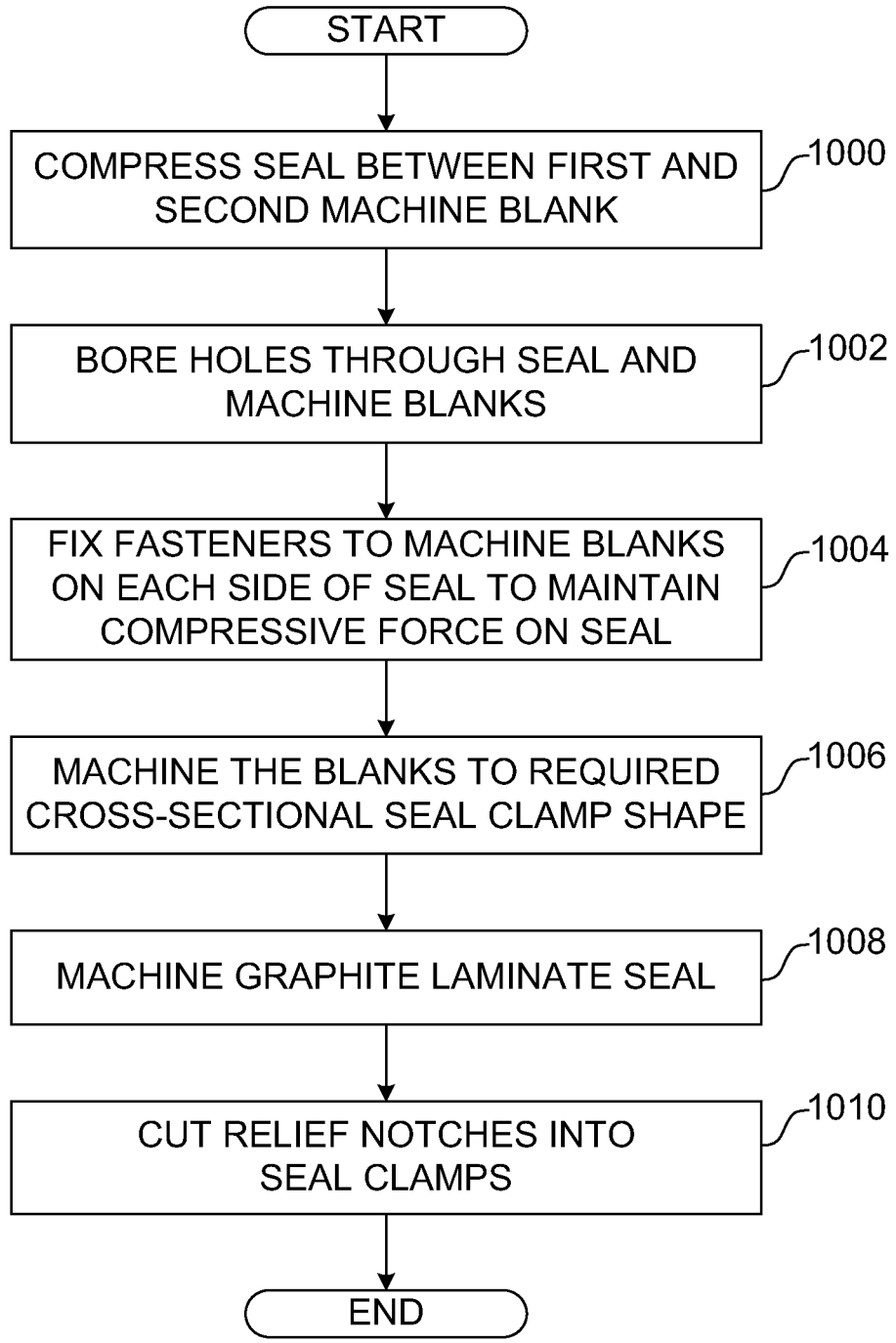
FIG. 10 is a flow chart representative of an example process that may be carried out to manufacture the example seal ring assemblies described herein.

FIG. 10 is a flow chart diagram representative of an example process to manufacture any of the example seal assemblies disclosed herein. For purposes of this disclosure, the example process is described primarily in connection with FIGS. 9A and 9B. Although the example process of FIG. 10 is described with reference to the flowchart of FIG. 10 in connection with FIGS. 9A and 9B, many other methods of implementing the example process of FIG. 10 may be employed. For example, the order of execution of certain blocks may be changed, and/or some of the blocks described may be changed, eliminated, sub-divided, or combined.

The example process of FIG. 10 begins at block 1000 by compressing a laminated graphite seal (e.g., the example seal 902 of FIG. 9A) between a first machine blank (e.g., the example first machine blank 904) and a second machine blank (e.g., the example second machine blank 906). The amount of pressure created by the compressive force is correlated to how much the seal is compressed. Thus, desired pressure may be achieved by controlling the amount the seal (e.g., the example seal 902) is compressed. A unit load of approximately 5000 psi may be desirable for some of the examples disclosed herein. Such a pressure corresponds to the seal (e.g., the example seal 902) being compressed approximately 43% of its thickness in a relaxed state. In some examples, the 43% compression may be controlled by placing the seal (e.g., the example seal 902) in a cavity (e.g., the example cavity 907) of one of the machine blanks having a depth that is 43% less than the thickness of the seal (e.g., the example seal 902) in a relaxed or uncompressed state. In this manner, as the first and second machine blanks (e.g., the machine blanks 904 and 906) are drawn together, the seal (e.g., the example seal 902) will compress until it becomes approximately the same thickness as the cavity (e.g., the example cavity 907). Furthermore, this method reduces the risk of over compression because the mating surfaces of the first and second machine blanks (e.g., the machine blanks 904 and 906) around the seal (e.g., the example seal 902) act as a fixed stop to the compression process. Alternatively, the amount the seal (e.g., the example seal 902) compresses may be controlled by the fixture used to compress the seal between the machine blanks Where metal shims are desired to provide a spring load on the seal (e.g., the example seal 902), as described in connection with FIGS. 2 and 2B, the depth of the cavity (e.g., the example cavity 907) may be appropriately adjusted to account for the thickness of the shims placed beneath and above the seal (e.g., the example seal 902) before compressing the assembly between the machine blanks (e.g., the example machine blanks 904 and 906).

At block 1002, holes are bored through the combined assembly of the seal (e.g., the example seal 902) and the first and second machine blanks (e.g., the example first and second machine blanks 904 and 906). At block 1004, while maintaining the compressive force on the seal (e.g. the example seal 902), fasteners (e.g., the example fastener 908) are inserted through the holes and fixed to the first and second machine blanks (e.g., the example first and second machine blanks 904 and 906). If pins are used as the fasteners, then block 1004 may include welding. Alternatively, if threaded fasteners are used, block 1004 may involve tapping the holes to fasten the assembly together. At block 1006, the first and second machine blanks are machined to the desired cross-sectional shape (e.g., the example dotted outline 914) to form the completed first and second seal clamps (e.g., the example first and second seal clamps 114 and 116 of FIG. 1). This machining process may include machining a groove around the outer diameter of one or both of the completed seal clamps to receive a spring wire (e.g., the example spring wire 140 of FIGS. 2 and 2) when the assembly is finally formed. The machine blanks (e.g., the example blanks 904 and 906) before machining may vary in size and/or shape depending on the design of the completed seal clamps. While many methods may be employed to cut the machine blanks (e.g., the example blanks 904 and 906) to any desired shape, some cutting methods may be inappropriate to machine the seal due to the nature of laminated graphite, which can easily fray or otherwise make a clean cut challenging. Accordingly, at block 1008, the exposed portions of the seal (e.g., the example seal 902) may be machined as needed via any suitable machining process, such as, for example, abrasive water jet cutting, to achieve the desired shape of the seal (e.g., the example seal 902) to properly engage a valve control member (e.g., the example disc 102 of FIG. 1) or a valve wall (e.g. the wall 516 of FIG. 5) once installed in a valve. Finally, at block 1010, relief notches (e.g., the relief notches 204 of FIG. 2) may be cut into the completed seal clamps to form segments (e.g., the example segments 202 shown in FIG. 2) as needed depending upon the design of the valve and/or environment in which the seal assembly is to be used. Where the seal assembly design is such that there is an insufficient spring force to return the seal when removed from sealing engagement with the valve, the spring wire (e.g., the spring wire 140) may be stretched around the seal clamp(s) where the groove was placed to provide an additional spring load. The ends of the spring wire may be fixed in place via any appropriate means such as tack welding.

Although certain example methods and apparatus have been described herein, the scope of coverage of this patent is not limited thereto. Such examples are intended to be non-limiting illustrative examples. On the contrary, this patent covers all methods and apparatus fairly falling within the scope of the appended claims either literally or under the doctrine of equivalents.

What is claimed is:

1. A seal ring assembly for use with a rotary valve, the seal ring assembly comprising:
   a ring-shaped seal to be fixed within the rotary valve, wherein the seal enables the sealing engagement of a control member with a flow control aperture, and wherein the seal is compressed between a first clamping surface and a second clamping surface by a compressive force; and
   a plurality of fasteners extending through the seal, wherein the fasteners are fixed relative to the first and second clamping surfaces to maintain the compressive force on the seal before the seal ring assembly is to be positioned within the rotary valve.

2. The seal ring assembly as defined in claim 1, wherein the fasteners are threaded fasteners.

3. The seal ring assembly as defined in claim 1, wherein the fasteners are fixed relative to the first and second clamping surfaces via welding.

4. The seal ring assembly as defined in claim 1, wherein the seal ring assembly has a substantially rectangular cross-section.

5. The seal ring assembly as defined in claim 4, wherein the seal ring assembly is to be pressed into a rectangular slot to produce a static seal on a backside of the rectangular slot.

6. The seal ring assembly as defined in claim 1, wherein the seal ring assembly has a substantially T-shaped cross-section.

7. The seal ring assembly as defined in claim 1, wherein the seal is to be fixed obliquely within a recess.

8. The seal ring assembly as defined in claim 1, wherein the seal is to be fixed perpendicular to a backside of a recess.

9. The seal ring assembly as defined in claim 1, wherein at least one of a first clamp corresponding to the first clamping surface or a second clamp corresponding to the second clamping surface is cut into segments by relief notches.

10. A seal ring assembly for use with a rotary valve, the seal ring assembly comprising:
    a ring-shaped seal to be fixed within the rotary valve, wherein the seal enables the sealing engagement of a control member with a flow control aperture, and wherein the seal is compressed between a first clamping surface and a second clamping surface by a compressive force; and
    a plurality of fasteners extending through the seal, wherein the fasteners are fixed relative to the first and second clamping surfaces to maintain the compressive force on the seal, wherein at least one of a first clamp corresponding to the first clamping surface or a second clamp corresponding to the second clamping surface is cut into segments by relief notches, wherein a spring wire is stretched around one of the first or second clamps.

11. A seal ring assembly for use with a rotary valve, the seal ring assembly comprising:
    a ring-shaped seal to be fixed within the rotary valve, wherein the seal enables the sealing engagement of a control member with a flow control aperture, and wherein the seal is compressed between a first clamping surface and a second clamping surface by a compressive force; and
    a plurality of fasteners extending through the seal, wherein the fasteners are fixed relative to the first and second clamping surfaces to maintain the compressive force on the seal, wherein at least one of a first clamp corresponding to the first clamping surface or a second clamp corresponding to the second clamping surface is cut into segments by relief notches, wherein the relief notches only partially segment the at least one of the first or second clamps.

12. The seal ring assembly as defined in claim 9, further comprising metal shims positioned between the seal and the at least one of the first or second clamps to support the seal.

13. The seal ring assembly as defined in claim 1, wherein the seal comprises an expanded graphite laminate.

14. The seal ring assembly as defined in claim 13, wherein the seal is laminated with at least one of polytetrafluoroethylene (PTFE), polyolefin material, Polybenzimidazole (PBI) fabric, or metal, between the expanded graphite.

15. The seal ring assembly as defined in claim 1, wherein a clamp associated with the second clamping surface has an opening to orient the seal.

16. The seal ring assembly as defined in claim 1, wherein the seal is to be secured to a body of the valve surrounding the flow control aperture.

17. The seal ring assembly as defined in claim 1, wherein the seal is to be secured to a surface of the control member.

18. A seal ring assembly for use with a rotary valve, the seal ring assembly comprising:
    a ring-shaped seal configured to be fixed within the rotary valve, wherein the seal enables the sealing engagement of a control member with a flow control aperture;
    a seal mount adjacent a first side of the seal to secure the seal within the rotary valve;
    an annular clamp adjacent a second side of the seal opposite the first side;
    a plurality of fasteners extending through the seal and fixed to the clamp and the seal mount to maintain a compressive force on the seal between the clamp and the seal mount before the seal ring assembly is to be positioned within the rotary valve.

19. The seal ring assembly as defined in claim 18, wherein the seal comprises an expanded graphite laminate.

\* \* \* \* \*